LOW NOISE TERMINATION FOR PARAMETRIC AMPLIFIER

Filed June 6, 1960

United States Patent Office 3,181,078
Patented Apr. 27, 1965

3,181,078
LOW NOISE TERMINATION FOR PARAMETRIC AMPLIFIER

Richard La Rosa, South Hempstead, N.Y., assignor to Hazeltine Research, Inc., a corporation of Illinois
Filed June 6, 1960, Ser. No. 33,990
7 Claims. (Cl. 330—4.6)

This invention relates to low noise terminations and, more particularly, to arrangements allowing resistive termination of energy with much less noise than is normally inherent in such terminations. Such terminations have particular utility in connection with traveling-wave parametric amplifiers and will be described with reference to such amplifiers.

It is known that in a device such as a traveling-wave parametric amplifier achieving negative resistance amplification, it is necessary that power be dissipated at an idler frequency if a net positive amount of power is to be produced at the output signal frequency. As used herein, an "idler signal" is a signal at a frequency equal to the difference between the pump and input signal frequencies in a traveling-wave parametric amplifier. Also, the term "pump signal" refers to an alternating current signal which supplies the energy required to produce amplification in a parametric amplifier. If idler frequency power is to be dissipated, it must be delivered to some load of a resistive nature, the characteristics of which directly influence the over-all noise figure achievable in the traveling-wave parametric amplifier.

The noise power which will be available for coupling back into a terminated circuit from a simple resistive termination is known to be approximately described by the product $k \cdot T \cdot B$, where: $k$ equals Boltzman's constant, T equals the temperature of resistive parts of the termination in degrees Kelvin, and B equals the frequency band width of the signals to be terminated. Thus, it will be seen that if the band width required is fixed, the only way low available noise power may be achieved is by refrigerating the termination or by otherwise effectively reducing T. Refrigeration, to be of real value, must be to a temperature approximating that of liquid oxygen or nitrogen. The apparatus required to produce such refrigeration is a burden which it is desirable to avoid in practical arrangements.

It is an object of this invention, therefore, to provide an improved low noise termination which avoids one or more of the disadvantages of prior art arrangements.

It is a further object of this invention to provide a low noise termination for a traveling-wave parametric amplifier which avoids any requirement for refrigeration.

In accordance with the invention, a low noise termination comprises first means for supplying signals to be terminated and a parametric up-converter coupled to the first means and including means for dissipating essentially all up-converted energy, whereby the signals supplied to the termination are terminated without further beneficial utilization.

For a better understanding of the present invention, together with other and further objects thereof, reference is had to the following description, taken in connection with the accompanying drawing, and its scope will be pointed out in the appended claims.

Figure 1:
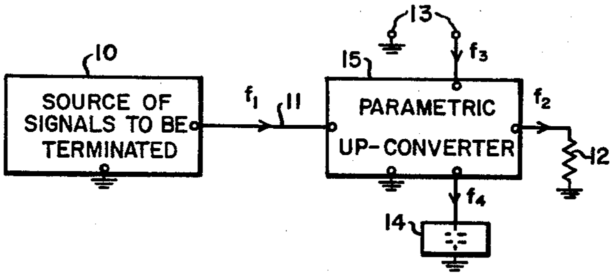
FIG. 1 is a schematic diagram of a signal source terminated in accordance with the invention.

Referring now to FIG. 1 of the drawings, there is shown an example of a low noise termination in accordance with the invention. This arrangement includes first means for supplying signals to be terminated, shown as source of signals to be terminated 10. Source 10 may be any appropriate apparatus which produces signals requiring a low noise termination (as for instance, a traveling-wave parametric amplifier as explained below with reference to the FIG. 2 arrangement). Such signals are applied to conductor 11 from source 10. The termination further includes a parametric up-converter 15 coupled to first means 10 via conductor 11. Up-converter 15 includes means for dissipating up-converted energy shown as resistor 12, pump signal input terminals 13 and a non-dissipative termination 14.

Parametric up-converter 15 may be of any appropriate construction utilizing, for example, one or more variable capacitance diodes able to produce parametric amplification as a result of being acted upon by the pump signal energy indicated as $f_3$ entering terminals 13. The theory and construction of parametric up-converters are well known and need not be considered in detail. Signals to be terminated, indicated as $f_1$, are supplied to up-converter 15 and are there converted to higher frequency signals through the parametric amplification process. In this example, it is arranged that the upper side band signals, indicated as $f_2$, produced in up-converter 15, are dissipated in resistor 12. The $f_2$ signals are of a frequency band width corresponding to the band width of the $f_1$ signals supplied to the up-converter and exist as upper side-band modulation of the fixed frequency of the pump signals $f_3$. Signals at other frequencies which result from the up-conversion process, for example, the lower side-band signals, may be terminated in nondissipative and, therefore, nonresistive terminations. This is indicated in FIG. 1 by signals $f_4$ coupled to a termination 14 which is shown as a dashed capacitor to indicate the reactive nature of this termination; the actual components of this termination being determined by the impedance required. These signals will be assumed to be properly terminated and will not be further mentioned with regard to the other arrangements.

Examining now the result of terminating the $f_1$ signals from the source 10 by coupling these signals to the up-converter 15, the effect is substantially as follows. If the circuit losses are small, the apparent noise temperature, looking into the up-converter 15, at conductor 11 is indicated by the following relationship known in the prior art:

$$T_{11} = T_{12} \cdot \frac{f_1}{f_2}$$

where $T_{11}$ is the apparent temperature looking in at conductor 11 and $T_{12}$ is the actual temperature of resistor 12 in degrees Kelvin. With reference to this equation, it will be seen that the apparent temperature of the termination of the $f_1$ signals can be made small by means of a large ratio of $f_2$ to $f_1$. For instance, if the $f_1$ signals lie within the range of 400–450 megacycles (per second), and the pump signal frequency $f_3$ equals 1000 megacycles, the upper side band signals $f_2$ will exist in the range of 1400–1450 megacycles. Assuming resistor 12 to be at room temperature or 290° K., by application of the above equation we find that the apparent temperature $T_{11}$ will be approximately 97° K. The noise power as previously described by the product $k \cdot T \cdot B$ available for coupling back into the source 10, will thus be reduced by a factor substantially similar to that achievable by refrigeration, as compared to a simple resistive termination at room temperature.

It should be appreciated that while the illustrated arrangement uses a simple resistor to dissipate energy, many other known types of resistive elements are applicable. In particular cases, the variable reactance element used in the up-converter may be chosen with characteristics such that the high frequency energy produced is dissipated in the reactive element itself with no need for an additional resistive load. Thus, variable capacitance diodes are now available for use in parametric amplifiers which have substantial inherent losses at frequencies above a few kilomegacycles, and such losses can be put to advantageous use in accordance with this invention to dissipate energy as it is up-converted.

Figure 2:
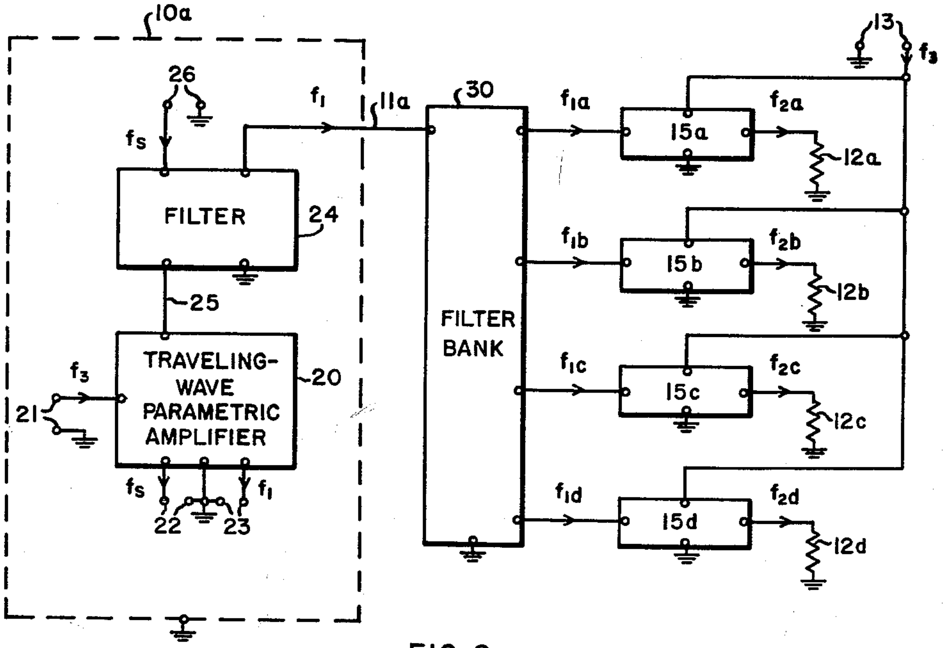
FIG. 2 illustrates a modification of the FIG. 1 arrangement useful in terminating signals of wide frequency band widths as produced by a traveling-wave parametric amplifier, and FIG. 3 comprises graphs useful in explaining the FIG. 2 arrangement.

Referring now to FIG. 2, there is shown a termination arrangement applicable to signals of wide frequency band widths. Included are first means 10*a* for supplying wide frequency band width signals to be terminated. As shown, means 10*a* comprise a traveling-wave parametric amplifier 20 having pump signal input terminals 21, amplified signal output terminals 22 and output end idler terminals 23. Amplifier 20 is coupled to filter 24 by conductor 25. Filter 24 has signal input terminals 26 and is coupled to conductor 11*a* so as to make available the signals to be terminated, as will be explained. This termination also includes second means shown as filter bank 30 coupled to means 10*a* via conductor 11*a*, for separating a wide frequency band width signal into a plurality of narrower band width signals. The termination further includes a plurality of parametric up-converters illustrated as 15*a*, 15*b*, 15*c* and 15*d*. Filter bank 30 is of any appropriate construction suitable to provide signal separation as described below and each parametric up-converter 15 is in accordance with the previous description pertaining to FIG. 1.

The theory and construction of traveling-wave parametric amplifiers are well known and a brief description will suffice here. In operation, input signals $f_s$ to be amplified are supplied to terminals 26 of filter 24. These signals are coupled substantially without change to conductor 25 which supplies the signals to the input of traveling-wave parametric amplifier 20. The parametric amplification process utilizing energy supplied at the pump frequency $f_3$ to terminals 21, causes a combination of frequencies to be present of which we are mainly concerned with the amplified input signals $f_s$ and idler frequency signals $f_1$. Amplified input signals $f_s$ appear at output terminals 22 and are available for coupling to desired utilization means. Idler signals appear at terminals 23 and may be either resistively terminated or further processed as desired. The principal noise problem previously referred to results from the fact that idler signals are also coupled back to the input conductor 25 of the parametric amplifier and the amplification process requires that these signals be coupled to a dissipative termination. Filter 24 is designed to separate the idler frequency signals $f_1$ from the input signals $f_s$. It should be appreciated that $f_s$ actually denotes signals in a band of frequencies corresponding to the range of input signal frequencies and $f_1$ denotes signals in a band of frequencies corresponding to the fixed pump signal frequency minus the input signal frequencies (i.e. $f_1=f_3-f_s$). The frequency separation between the idler signals $f_1$ and the input signals $f_s$ may be arranged to be the minimum required to allow separation by a filter such as filter 24.

Figure 3A:
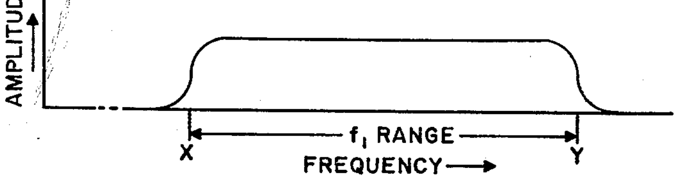
Figure 3B:
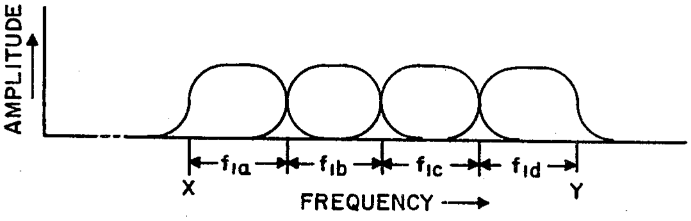

A traveling-wave parametric amplifier, such as 20, may be designed to amplify relatively wide frequency band width signals. This requires that idler frequency signals of substantially the same band width must be terminated. It may not be possible to design a single up-converter having sufficient band width so as to supply a resistive termination over the entire frequency range of the idler signals. Thus, referring to FIG. 3*a*, which illustrates an idler signal to be terminated, the frequencies present cover the range between X and Y, as indicated by "$f_1$ range." As shown in FIG. 3*b*, a single up-converter may only be able to resistively terminate energy in a range of frequencies such as any one of the ranges indicated as $f_{1a}$, $f_{1b}$, $f_{1c}$ and $f_{1d}$. By inserting a filter bank 30 as indicated in FIG. 2 between the source of signals to be terminated and a plurality of individual parametric up-converters, a signal as shown in FIG. 3*a* can be separated into a plurality of narrower frequency band width signals and each of these signals coupled to a separate parametric up-converter. In this way each one of the individual up-converters 15*a*, 15*b*, 15*c* and 15*d* operates on a relatively narrow band width signal. Energy supplied by signals in the range of frequencies indicated as $f_{1a}$ in FIG. 3*b*, is coupled to up-converter 15*a* and the up-converted energy (upper side-band signals denoted $f_{2a}$ in FIG. 2) produced by the up-conversion process, is dissipated in resistor 12*a*. In like manner, each of the remainnig up-converters 15*b*, 15*c* and 15*d* act upon the respective narrower band width signals shown in FIG. 3*b* with the result that energy supplied by the entire $f_1$ range of signals, as shown in FIG. 3*a*, is effectively terminated. The noise power available as a result of such termination is substantially reduced as previously explained.

It may help to have in mind the frequencies which might be involved in an actual arrangement in accordance with the invention as shown in FIG. 2. Assuming the input signals $f_s$ to be amplified by amplifier 20 lie within the range of 400–450 megacycles, and pump signals $f_3$ are supplied at a frequency of 1000 megacycles, then the idler signals $f_1$ to be terminated will exist in the range of 600–550 megacycles. When pump signals $f_3$ and the idler signals $f_1$ are supplied to the up-converters 15, upper side band signals $f_2$ will be within the range of 1600–1550 megacycles with signals in a portion of this frequency band being supplied to each of respective up-converters 15*a*, 15*b*, 15*c* and 15*d*. The resulting apparent noise temperature can be computed using the equation previously given which, after a slight change required because of the two successive frequency conversion processes, becomes:

$$T_{11}=T_{12}\cdot\frac{f_s}{f_1}\cdot\frac{f_1}{f_2}$$

and the apparent noise temperature $T_{11}$ in this case will be approximately 80° K.

In the above example, the pump energy $f_3$ has been supplied to amplifier 20 and each of the up-converters 15 at the same frequency. While this may be desired in order to simplify the associated supply equipment, it is not necessary; the pump energy to each may be supplied at any desired frequency.

While there have been described what are at present considered to be the preferred embodiments, it will be obvious to those skilled in the art that various changes and modifications may be made therein without departing from the invention. The invention is believed to be particularly useful in terminating traveling-wave parametric amplifiers but it should be appreciated that the present concepts may find application wherever a low noise termination is desired. Also, while the "conductors" for coupling signals to the various components of the terminations are shown as simple wires, these conductors may in fact be wave guides or other signal transmission means. It is, therefore, aimed in the appended claims to cover all such changes and modifications as fall within the true spirit and scope of the invention.

What is claimed is:

1. A low noise termination comprising: first means for supplying signals to be terminated; and a parametric up-converter coupled to said first means and including means for dissipating essentially all up-converted energy; whereby said signals supplied to said termination are terminated without further beneficial utilization.

2. A low noise termination comprising: first means for supplying signals to be terminated; and a parametric up-converter coupled to said first means and including means for dissipating essentially all upper side-band energy produced in said up-converter; whereby said signals supplied to said termination are terminated without further beneficial utilization.

3. A low noise termination comprising: first means for supplying energy to be terminated; a parametric up-converter coupled to said first means; and solely a resistor coupled to said up-converter for dissipating essentially all upper side-band energy produced in said up-converter; whereby said signals supplied to said termination are terminated without further beneficial utilization.

4. A low noise termination comprising: first means for supplying wide frequency band width signals to be terminated; second means coupled to said first means for separating said signal into a plurality of narrower frequency band width signals; and a plurality of parametric up-converters coupled to said second means, each arranged to up-convert and dissipate essentially all energy supplied by one of said narrower band width signals; whereby said signals supplied to said termination are terminated without further beneficial utilization.

5. A low noise termination comprising: first means for supplying wide frequency band width signals to be terminated; second means coupled to said first means for separating said signal into a plurality of narrower frequency band width signals; a plurality of parametric up-converters coupled to said second means, each arranged to up-convert energy supplied by one of said narrower band width signals; and means for dissipating essentially all up-converted energy produced in said up-converters; whereby said signals supplied to said termination are terminated without further beneficial utilization.

6. A low noise termination comprising: a traveling-wave parametric amplifier for supplying wide frequency band width idler signals to be terminated; second means coupled to said amplifier for separating said signal into a plurality of narrower frequency band width signals; and a plurality of parametric up-converters coupled to said second means, each arranged to up-convert and dissipate essentially all energy supplied by one of said narrower band width signals; whereby said signals supplied to said termination are terminated without further beneficial utilization.

7. A low noise termination comprising: first means for supplying wide band width signals to be terminated; filter means coupled to said first means for separating said signal into a plurality of narrower band width signals; a plurality of parametric up-converters coupled to said filter means, each arranged to up-convert energy supplied by one of said narrower band width signals; and solely a plurality of resistors one coupled to each of said up-converters for dissipating essentially all upper side band energy produced in said up-converters; whereby said signals supplied to said termination are terminated without further beneficial utilization.

References Cited by the Examiner

UNITED STATES PATENTS 1,206,643 11/16 Alexanderson ............ 330—5

OTHER REFERENCES

Terman and Pettit: "Electronic Measurements," 2nd Ed., published by McGraw-Hill, New York, 1952, pages 362–367.

Weber: "Electronics-Engineering Issue," Sept. 26, 1958, pp. 65–71.

Heffner et al.: "Journal of Applied Physics," September 1958, pages 1321–1331 (page 1321 particularly).

Sie et al.: "1959" IRE National Convention Record—Part 3," pages 141–157 (page 146 particularly).

Uenohara: "Proceedings of the IRE," February 1960, pages 169–179 (page 175 particularly).

Greene et al.: "Proceedings of the IRE," September 1960, pages 1583–1590.

ROY LAKE, *Primary Examiner.*

ELI J. SAX, BENNETT G. MILLER, *Examiners.*